H. HESS.
ANTIFRICTION BEARING.
APPLICATION FILED JAN. 6, 1909.
1,182,370.
Patented May 9, 1916.
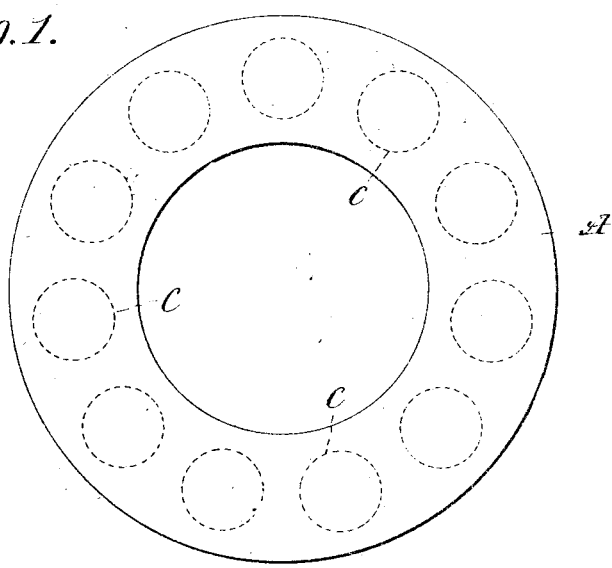
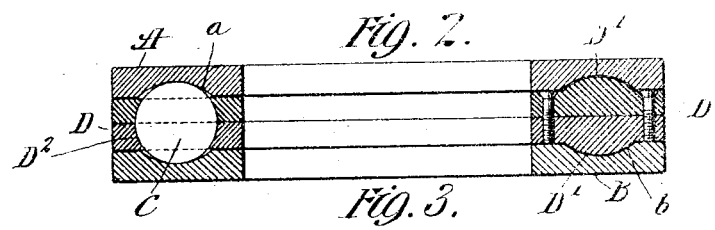
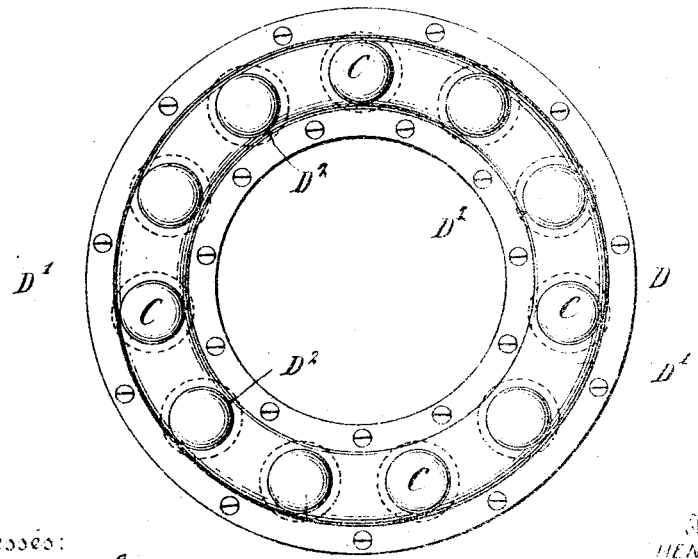
Witnesses:
Inventor
HENRY HESS,
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,182,370.

Specification of Letters Patent.

Patented May 9, 1916.

Application filed January 6, 1909. Serial No. 470,937.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

My invention relates to anti-friction bearings, and more particularly to that class thereof comprising casing members formed with tracks or ways and rolling elements located therein. In connection with such construction, I provide an additional or supplemental bearing device, also located between the casing members and in proximity thereto, and corresponding in contour to the proximate surfaces of the casing members. More specifically, this supplemental bearing device is so shaped that it runs in close relation with the casing members, both within the tracks or ways formed therein, as well as the interior surfaces of the casing members beyond and without the tracks or ways, and also serves to space the rolling elements in the tracks or ways. The device has practically a running fit in relation to the surfaces of the casing members, there being only enough clearance to permit the formation of oil films, these oil films being of sufficient extent to dampen and cushion out the vibration and chatter, and also to assist the rolling elements by sustaining a portion of the load. It is to be understood that the oil films referred to are such as are formed by the cohesion of the lubricating fluid, and are retained in proper position by their adhesion to one or both of the contiguous parts, which parts are so close to each other that the oil film formed between them is in contact with both of them substantially all the time, and it is this filling up of the space between the parts by the lubricant which has the effects described, namely, of deadening or dampening out the vibration, and further of assisting to sustain the load, both of which effects are secured because of the cushion-like and elastic properties of the film.

From another aspect, the invention broadly relates to the employment of both rolling elements and a sliding bearing device between the casing members, which results in the load being borne in part by each.

Still another advantage arising from this construction, is that the auxiliary device acts as an emergency bearing to sustain the entire load in the event of accident or breakdown in the rolling elements.

I have shown in the drawings one mode of embodying my invention in practice, and as illustrative of its general principles. The form therein illustrated by way of example is its application to a thrust bearing, but I do not limit my invention to such embodiment, or in fact to any particular form, whether of the thrust or radial type. Obviously many changes and variations may be made therein without departure from the spirit of the invention, and I desire to be understood that it is not limited to any specific form or arrangement of parts except in so far as such limitations are specified in the claim.

Referring to the drawing, Figure 1 is a top plan view of a thrust bearing having my invention applied thereto; Fig. 2 is a transverse vertical section thereof; and Fig. 3 is a view of the supplemental bearing device detached.

The thrust bearing illustrated comprises the upper and lower casing members or rings A and B, formed respectively with tracks or ways $a$, $b$, wherein are located the balls or other rolling elements C, all in the well-known and customary manner. Also mounted between the casing members A and B is the supplemental bearing device, consisting in the present instance of a flat ring-shaped structure D, located in close proximity to the inner surfaces of the casing members and having practically a running fit in connection therewith. This ring is formed at opposite sides with annular ribs or ridges $D^1$, $D^1$, so placed that they enter and virtually fill the sunken tracks or ways $a$, $b$, in the casing members. At suitable intervals throughout its circumference the ring D is formed with spherical spaces or recesses $D^2$, wherein are located the balls C, and which serve to space the balls within the bearing. Due to the spherical shape of these cavities $D^2$, the ribs or ridges $D^1$, $D^1$, practically fill the tracks or ways at all portions thereof except at the immediate points where the balls C project therethrough. The device D is formed in two parts to permit of the introduction of the balls into the spherical cavities therein, after which the two sections are united by screws, or in any suitable manner. As previously described, the outer surfaces of the ring D are in close proximity to the surfaces of the casing members A and B, not only with reference to their flat portions, but also within the tracks or ways themselves. The amount of clearance between the device D and the casing members is very slight and only of sufficient extent to permit the formation of oil films, which, due to their elasticity, not only serve to dampen and deaden the vibration and chatter of the parts, but also permit the device D to sustain a portion of the load, thus dividing it with the rolling elements.

Another advantage arising from this construction is the fact that in the event of accident to the rolling elements, or of other breakdown, the sliding device will sustain the load and prevent further injury to the parts. As before stated, I do not limit myself to the exact construction shown, which is illustrated merely by way of example, as obviously many variations and changes will suggest themselves to those skilled in the art.

Having thus described my invention, its construction and mode of operation, what I claim and desire to secure by Letters Patent of the United States is as follows:

In an anti-friction bearing, the combination of casing members provided with grooved tracks or ways and rolling elements located therein, with a solid cage formed with pockets for the rolling elements and with extensions to engage slidably and constantly with the casing members both within and without the grooved tracks or ways; whereby said cage subserves the double function of spacing the balls and of sustaining the load conjointly with the rolling elements in the normal operation of the bearing.

In testimony whereof I have affixed my signature in presence of two witnesses.

HENRY HESS.

Witnesses:
 THEO. H. McCALLA,
 P. L. McCALLA.